(12) United States Patent
DeFelice et al.

(10) Patent No.: US 10,875,250 B2
(45) Date of Patent: Dec. 29, 2020

(54) METHOD FOR ANALYTICALLY DETERMINING LASER POWER FOR LASER SINTERING

(71) Applicant: Hexcel Corporation, Stamford, CT (US)

(72) Inventors: Scott DeFelice, Holyoke, MA (US); Anthony DeCarmine, Lebanon, CT (US)

(73) Assignee: Hexcel Corporation, Stamford, CT (US)

( * ) Notice: Subject to any disclaimer, the term of this patent is extended or adjusted under 35 U.S.C. 154(b) by 328 days.

(21) Appl. No.: 15/872,496

(22) Filed: Jan. 16, 2018

(65) Prior Publication Data

US 2018/0200960 A1  Jul. 19, 2018

Related U.S. Application Data

(60) Provisional application No. 62/446,460, filed on Jan. 15, 2017, provisional application No. 62/446,470, filed on Jan. 15, 2017.

(51) Int. Cl.
  *B29C 64/393* (2017.01)
  *B29C 64/153* (2017.01)
  (Continued)

(52) U.S. Cl.
  CPC .......... *B29C 64/393* (2017.08); *B29C 64/153* (2017.08); *B29K 2071/00* (2013.01); *B33Y 50/02* (2014.12)

(58) Field of Classification Search
  CPC ... B29C 64/393; B29C 64/386; B29C 64/153; B33Y 50/02; B29K 2071/00; B22F 3/1055
  See application file for complete search history.

(56) References Cited

U.S. PATENT DOCUMENTS 3,065,205 A   11/1962  Bonner, Jr.
3,441,538 A    4/1969  Marks
(Continued)

FOREIGN PATENT DOCUMENTS

WO      2014037375 A1    3/2014
WO      2014100320 A1    6/2014
WO   WO-2015124903 A1 *  8/2015  ........... B29C 64/357

OTHER PUBLICATIONS

Drummer et al., "Development of a characterization approach for the sintering behavior of new thermoplastics for selective laser sintering", 2010, Physics Procedia 5, 533-542. (Year: 2010).*

(Continued)

*Primary Examiner* — Joseph S Del Sole
*Assistant Examiner* — Jerzi H Moreno Hernandez
(74) *Attorney, Agent, or Firm* — Welsh IP Law LLC (57) ABSTRACT

A method of analytically determining a laser power for laser sintering includes choosing a batch of powder material for building a plurality of test rods; selecting a range of laser power for building the test rods; determining a plurality of power increments within the selected range to define a plurality of laser power settings; programming a laser sintering machine to build at least one test rod at each laser power setting; constructing the test rods; wherein the optimal power is at least one watt below a lowest laser power setting associated with the formation of voids; identifying the laser power setting used to construct a respective test rod without formation of voids in the surface as an optimal laser power; and configuring the selective laser sintering machine with the optimal laser power when conducting a laser sintering process using the chosen batch of powder material.

19 Claims, 10 Drawing Sheets

(51) Int. Cl.
   *B29K 71/00*   (2006.01)
   *B33Y 50/02*   (2015.01)

(56) References Cited

U.S. PATENT DOCUMENTS

| | | | |
|---|---|---|---|
| 3,442,857 | A | 5/1969 | Thornton |
| 3,516,966 | A | 6/1970 | Berr |
| 4,540,630 | A | 9/1985 | Wegner et al. |
| 4,704,448 | A | 11/1987 | Brugel |
| 4,816,556 | A | 3/1989 | Gay et al. |
| 4,897,286 | A | 1/1990 | Kosuda et al. |
| 5,041,335 | A | 8/1991 | Inai et al. |
| 5,733,497 | A | 3/1998 | McAlea et al. |
| 6,177,518 | B1 | 1/2001 | Lahijani |
| 8,765,265 | B2 | 7/2014 | Kyomoto et al. |
| 9,611,355 | B2 | 4/2017 | Martinoni et al. |
| 9,937,667 | B2 | 4/2018 | DeFelice et al. |
| 2005/0207931 | A1 | 9/2005 | Hesse et al. |
| 2006/0119012 | A1 | 6/2006 | Ruatta et al. |
| 2009/0312454 | A1* | 12/2009 | Leuterer ............ B29C 35/16 522/164 |
| 2010/0174392 | A1* | 7/2010 | Fink .................. B33Y 50/02 425/174.4 |
| 2014/0163717 | A1* | 6/2014 | Das .................... C30B 13/28 700/119 |
| 2015/0061195 | A1 | 3/2015 | DeFelice et al. |
| 2017/0027624 | A1* | 2/2017 | Wilson ............. A61B 17/7233 |
| 2017/0282455 | A1 | 10/2017 | DeFelice et al. |

OTHER PUBLICATIONS

Berretta et al., "Processability of PEEK, a new polymer for high temperature laser sintering (HT-LS)", Apr. 11, 2015, European Polymer Journal 68, 243-266. (Year: 2015).*

Schmidt et al, "Selective laser sintering of PEEK", 2007, Annals of the CIRP 56(1), 205-208. (Year: 2007).*

International Search Report Written Opinion of the International Searching Authority Application No. PCT/US2019/013780 completed: Mar. 13, 2019; dated Apr. 1, 2019 7 Pages.

European Search Report Application No. EP 18 18 2749 Completed: Nov. 16, 2018;dated Nov. 30, 2018 11 pages.

U.S. Office Action U.S. Appl. No. No. 15/872,598 dated Sep. 19, 2019 8 Pages.

Cheng, Z. D., et al., "Polymorphism and crystal structure identification in poly(aryl ether ketone ketone)s", Macromol. Chem. Phys. 197, 185-213 (1996).

* cited by examiner

| Lot Number | Type of Powder Material | Optimal Laser Power |
|---|---|---|
| 300393 | Virgin ESD PEKK + Fines | 13.5 W |
| 7215 | Virgin ESD PEKK | 13.0 W |
| 300652 | Cake A ESD (First Recycle of PEKK powder) | 8.0 W |
| 300595 | Cake B ESD (Second Recycle of PEKK powder) | 5.0 W |

FIG. 4

| Table 1A - Job No. 300393 Virgin ESD with fines |||||||| 
| --- | --- | --- | --- | --- | --- | --- | --- |
| | x-axis |||| z-axis |||
| Power (W) | Young's (kpsi) | Break (psi) | Elongation (%) | Voids | Young's (kpsi) | Break (psi) | Elongation (%) |
| 15 | 1060 | 17840 | 2.3 | Yes | 732.4 | 9898 | 1.44 |
| 14.5 | 1046 | 18360 | 2.44 | Yes | 735.2 | 10098 | 1.5 |
| 14 | 1022.2 | 18160 | 2.36 | No | 741 | 10586 | 1.54 |
| 13.5 | 1032 | 17920 | 2.22 | No | 757.2 | 10680 | 1.54 |
| 13 | 1032 | 18060 | 2.36 | No | 745.4 | 10190 | 1.48 |
| 12.5 | 1032 | 18340 | 2.36 | No | 754.6 | 9582 | 1.36 |
| 12 | 1036.8 | 17900 | 2.2 | No | 764.4 | 9596 | 1.36 |
| 11.5 | 1044 | 18180 | 2.32 | No | 775.4 | 9390 | 1.3 |

FIG. 5a

| Table 2A - Job No. 7215 Virgin ESD ||||||||
| --- | --- | --- | --- | --- | --- | --- | --- |
| | x-axis |||| z-axis |||
| Power (W) | Young's (kpsi) | Break (psi) | Elongation (%) | Voids | Young's (kpsi) | Break (psi) | Elongation (%) |
| 14.5 | 1043 | 18300 | 2.46 | Yes | 749.8 | 9786 | 1.42 |
| 14 | 1034.6 | 18500 | 2.62 | Yes | 768 | 9756 | 1.42 |
| 13.5 | 1051.4 | 18700 | 2.6 | No | 767 | 10064 | 1.46 |
| 13 | 1027.6 | 18340 | 2.46 | No | 739 | 10696 | 1.56 |
| 12.5 | 1042 | 18480 | 2.56 | No | 743.2 | 10042 | 1.44 |
| 12 | 1036 | 18340 | 2.54 | No | 772.2 | 9442 | 1.32 |
| 11.5 | 1058 | 18200 | 2.46 | No | 759.2 | 8708 | 1.24 |
| 11 | 1009.2 | 17600 | 2.24 | No | 767 | 9606 | 1.38 |

FIG. 5b

| Table 3A – Job No. 300652 Cake A ESD ||||||||
|---|---|---|---|---|---|---|---|
| | x-axis |||| z-axis |||
| Power (W) | Young's (kpsi) | Break (psi) | Elongation (%) | Voids | Young's (kpsi) | Break (psi) | Elongation (%) |
| 9 | 953.2 | 16820 | 1.98 | Yes | 738.4 | 10762 | 1.54 |
| 8.5 | 970.8 | 16400 | 1.94 | No | 770.4 | 10746 | 1.48 |
| 8 | 947 | 15940 | 1.82 | No | 743.75 | 10375 | 1.475 |
| 7.5 | 955 | 15140 | 1.74 | No | 749 | 10580 | 1.46 |
| 7 | 970.2 | 14680 | 1.66 | No | 736.8 | 10202 | 1.44 |
| 6.5 | 920.2 | 14320 | 1.66 | No | 733.8 | 10410 | 1.48 |
| 6 | 912.2 | 12800 | 1.48 | No | 754.4 | 9584 | 1.32 |
| 5.5 | 897.4 | 12240 | 1.5 | No | 741.2 | 9364 | 1.32 |

FIG. 5c

| Table 4A – Job No. 300595 Cake B ESD ||||||||
|---|---|---|---|---|---|---|---|
| | x-axis |||| z-axis |||
| Power (W) | Young's (kpsi) | Break (psi) | Elongation (%) | Voids | Young's (kpsi) | Break (psi) | Elongation (%) |
| 6.5 | 1034 | 15560 | 1.78 | Yes | 818.2 | 11680 | 1.62 |
| 6 | 1021.2 | 15520 | 1.78 | Yes | 817.6 | 11880 | 1.66 |
| 5.5 | 1024.6 | 15360 | 1.74 | No | 833.6 | 10810 | 1.44 |
| 5 | 1006 | 14780 | 1.76 | No | 807.6 | 10616 | 1.44 |
| 4.5 | 960.2 | 12820 | 1.5 | No | 797 | 10174 | 1.38 |
| 4 | 994.4 | 12800 | 1.46 | No | 778.8 | 9422 | 1.34 |
| 3.5 | 884.6 | 10394 | 1.26 | No | 786.8 | 8694 | 1.176 |
| 3 | 673.6 | 7388 | 1.3 | No | 749 | 6644 | 0.926 |

FIG. 5d

| Table 1B – Job No. 300393 Virgin ESD with fines | |
|---|---|
| Power | x-axis Inspection |
| 15 | BROKE ON BOTTOM EDGE OF KNIFE / MILD POROSITY / PRE-DELAMINATION / BURN MARK; BROKE ON BOTTOM EDGE OF KNIFE / MILD POROSITY / PRE-DELAMINATION / BOWING / TOOLING MARKS; BROKE ON TOP EDGE OF KNIFE / MILD POROSITY / DELAMINATION / BOWING; BROKE ON CENTER OF BAR / MILD POROSITY / DELAMINATION; BROKE ON TOP EDGE OF KNIFE / VOID (~0.031") / MILD POROSITY / PRE-DELAMINATION / BOWING / DISCOLORATION |
| 14.5 | BROKE ON TOP EDGE OF KNIFE / VOID (~0.011") / MILD POROSITY / DELAMINATION BROKE ON TOP EDGE OF KNIFE / MILD POROSITY / DELAMINATION / DISCOLORATION BROKE ON BOTTOM EDGE OF KNIFE / MILD POROSITY / DELAMINATION / BOWING BROKE ON TOP EDGE OF KNIFE / VOID (~0.006") / MILD POROSITY / BOWING / DISCOLORATION BROKE ON BOTTOM EDGE OF KNIFE / MILD POROSITY / BOWING / BURN MARK |
| 14 | BROKE ON TOP EDGE OF KNIFE / MILD POROSITY / DELAMINATION; BROKE ON BOTTOM EDGE OF KNIFE / MILD POROSITY / DELAMINATION / BOWING BROKE ON BOTTOM EDGE OF KNIFE / MILD POROSITY / PRE-DELAMINATION / BURN MARK; BROKE ON TOP EDGE OF KNIFE / MILD POROSITY / BURN MARK; BROKE ON TOP EDGE OF KNIFE / MILD POROSITY / DELAMINATION / BOWING |
| 13.5 | BROKE ON TOP EDGE OF KNIFE / MILD POROSITY / DELAMINATION / BOWING / BURN MARK; BROKE ON BOTTOM EDGE OF KNIFE / MILD POROSITY / DELAMINATION / BOWING / DISCOLORATION; BROKE ON TOP EDGE OF KNIFE / MILD POROSITY; BROKE ON CENTER OF BAR / MILD POROSITY / BURN MARK; BROKE ON TOP EDGE OF KNIFE / MILD POROSITY |
| 13 | BROKE ON TOP EDGE OF KNIFE / MILD POROSITY / DELAMINATION / DISCOLORATION; BROKE ON BOTTOM EDGE OF KNIFE / MILD POROSITY / DELAMINATION / BOWING; BROKE ON BOTTOM EDGE OF KNIFE / MILD POROSITY / DELAMINATION / BOWINGBROKE ON BOTTOM EDGE OF KNIFE / MILD POROSITY / DELAMINATION; BROKE ON BOTTOM EDGE OF KNIFE / MILD POROSITY / PRE-DELAMINATION |
| 12.5 | BROKE ON TOP EDGE OF KNIFE / MILD POROSITY; BROKE ON TOP EDGE OF KNIFE / MILD POROSITY / PRE-DELAMINATION / BURN MARK; BROKE ON TOP EDGE OF KNIFE / MILD POROSITY / DELAMINATION; BROKE ON BOTTOM EDGE OF KNIFE / MILD POROSITY / BURN MARK; BROKE ON TOP EDGE OF KNIFE / MILD POROSITY / DELAMINATION / DISCOLORATION |
| 12 | BROKE ON TOP EDGE OF KNIFE / MILD POROSITY / DELAMINATION / BURN MARK; BROKE ON TOP EDGE OF KNIFE / MILD POROSITY; BROKE ON BOTTOM EDGE OF KNIFE / MILD POROSITY; BROKE ON TOP EDGE OF KNIFE / MILD POROSITY / DELAMINATION / DISCOLORATION; BROKE ON TOP EDGE OF KNIFE / MILD POROSITY / BOWING |
| 11.5 | BROKE ON BOTTOM EDGE OF KNIFE / MILD POROSITY / DELAMINATION; BROKE ON BOTTOM EDGE OF KNIFE / MILD POROSITY / DELAMINATION / BOWING; BROKE ON TOP EDGE OF KNIFE / MILD POROSITY / BOWING; BROKE ON TOP EDGE OF KNIFE / MILD POROSITY; BROKE ON BOTTOM EDGE OF KNIFE / MILD POROSITY / PRE-DELAMINATION / BURN MARK |

FIG. 6a

| Table 2B – Job No. 7215 Virgin ESD ||
|---|---|
| Power | x-axis Inspection |
| 14.5 | BROKE ON BOTTOM EDGE OF KNIFE / MILD POROSITY / DISCOLORATION / BOWING; BROKE ON TOP EDGE OF KNIFE / MICRO POROSITY / BURN MARK / DELAMINATION; BROKE ON TOP EDGE OF KNIFE / MICRO POROSITY / BURN MARK; BROKE ON BOTTOM EDGE OF KNIFE / MICRO POROSITY / BURN MARK; BROKE ON CENTER OF BAR / MICRO POROSITY / BURN MARK |
| 14 | BROKE ON BOTTOM EDGE OF KNIFE / MILD POROSITY / DISCOLORATION; BROKE ON BOTTOM EDGE OF KNIFE / MICRO POROSITY / DISCOLORATION; BROKE ON BOTTOM EDGE OF KNIFE / MICRO POROSITY / DISCOLORATION / DELAMINATION; BROKE ON BOTTOM EDGE OF KNIFE / MILD POROSITY / DISCOLORATION; BROKE NEAR CENTER OF BAR / MILD POROSITY / SMALL VOID (0.016") / DISCOLORATION |
| 13.5 | BROKE ON TOP EDGE OF KNIFE / MICRO POROSITY / DISCOLORTION; BROKE ON TOP EDGE OF KNIFE / MICRO POROSITY / BOWING; BROKE ON TOP EDGE OF KNIFE / MICRO POROSITY / DISCOLORATION; BROKE ON TOP EDGE OF KNIFE / MICRO POROSITY / DISCOLORATION; BROKE ON CENTER OF BAR / MICRO POROSITY / BURN MARK / BOWING |
| 13 | BROKE ON TOP EDGE OF KNIFE / MILD POROSITY / BURN MARK; BROKE ON BOTTOM EDGE OF KNIFE / MICRO POROSITY / BURN MARK / BOWING; BROKE ON BOTTOM EDGE OF KNIFE / MILD POROSITY / DISCOLORATION; BROKE ON TOP EDGE OF KNIFE / MILD POROSITY / DISCOLORATION / BOWING; BROKE ON TOP EDGE OF KNIFE / MICRO POROSITY / DISCOLORATION |
| 12.5 | BROKE ON BOTTOM EDGE OF KNIFE / MICRO POROSITY / DISCOLORATION; BROKE ON TOP EDGE OF KNIFE / MICRO POROSITY / BURN MARK; BROKE ON TOP EDGE OF KNIFE / MICRO POROSITY / BURN MARK; BROKE ON BOTTOM EDGE OF KNIFE / MICRO POROSITY / BURN MARK; BROKE ON BOTTOM EDGE OF KNIFE / MILD POROSITY / DISCOLORATION |
| 12 | BROKE ON TOP EDGE OF KNIFE / MICRO POROSITY / DISCOLORATION; BROKE NEAR CENTER OF BAR / MICRO POROSITY / BURN MARK; BROKE ON CENTER OF BAR / MICRO POROSITY; BROKE ON BOTTOM EDGE OF KNIFE / MICRO POROSITY / DISCOLORATION; BROKE ON TOP EDGE OF KNIFE / MICRO POROSITY / DISCOLORATION |
| 11.5 | BROKE ON BOTTOM EDGE OF KNIFE / MILD POROSITY / DISCOLORATION; BROKE ON TOP EDGE OF KNIFE / MICRO POROSITY / DISCOLORATION; BROKE ON BOTTOM EDGE OF KNIFE / MICRO POROSITY; BROKE ON TOP EDGE OF KNIFE / MILD POROSITY / DISCOLORATION; BROKE ON TOP EDGE OF KNIFE / MILD POROSITY / DISCOLORATION |
| 11 | BROKE ON BOTTOM EDGE OF KNIFE / MICRO POROSITY; BROKE ON BOTTOM EDGE OF KNIFE / MILD POROSITY / DISCOLORATION; BROKE ON CENTER OF BAR / MICRO POROSITY / BURN MARK; BROKE ON BOTTOM EDGE OF KNIFE / MILD POROSITY / DISCOLORATION; BROKE ON TOP EDGE OF KNIFE / MICRO POROSITY / DISCOLORATION |

FIG. 6b

| Power | Table 3B – Job No. 300652 Cake A ESD<br>x-axis Inspection |
|---|---|
| 9 | BROKE ON TOP EDGE OF KNIFE / MILD POROSITY / DISCOLORATION; BROKE ON TOP EDGE OF KNIFE / MILD POROSITY / BOWING ON UPSKIN / DISCOLORATION IN BREAK AND ON SURFACE; OF BAR; BROKE ON TOP EDGE OF KNIFE / MILD POROSITY / DISCOLORATION IN BREAK AND ON SURFACE OF BAR; BROKE ON BOTTOM EDGE OF KNIFE / MILD POROSITY / VOID (~0.020") / DISCOLORATION IN BREAK AND ON SURFACE OF BAR; BROKE ON BOTTOM EDGE OF KNIFE / MILD POROSITY / DISCOLORATION IN BREAK AND ON SURFACE OF BAR |
| 8.5 | BROKE ON TOP EDGE OF KNIFE / MILD POROSITY / DISCOLORATION; BROKE ON TOP EDGE OF KNIFE / MILD POROSITY / DISCOLORATION IN BREAK AND ON SURFACE OF BAR; BROKE ON BOTTOM EDGE OF KNIFE / MILD POROSITY / DISCOLORATION IN BREAK AND ON SURFACE OF BAR; BROKE ON TOP EDGE OF KNIFE / MILD POROSITY / BOWING ON DOWNSKIN / DISCOLORATION; BROKE ON BOTTOM EDGE OF KNIFE / MILD POROSITY / DISCOLORATION IN BREAK AND ON SURFACE OF BAR |
| 8 | BROKE ON TOP EDGE OF KNIFE / MILD POROSITY / DISCOLORATION; BROKE ON BOTTOM EDGE OF KNIFE / MILD POROSITY / BOWING ON DOWNSKIN / DISCOLORATION IN BREAK AND ON SURFACE OF BAR; BROKE ON TOP EDGE OF KNIFE / MILD POROSITY / DISCOLORATION IN BREAK AND ON SURFACE OF BAR; BROKE ON TOP EDGE OF KNIFE / MILD POROSITY / DISCOLORATION IN BREAK AND ON SURFACE OF BAR; BROKE ON TOP EDGE OF KNIFE / MILD POROSITY / BOWING ON DOWNSKIN / DISCOLORATION IN BREAK AND ON SURFACE OF BAR |
| 7.5 | BROKE ON TOP EDGE OF KNIFE / MILD POROSITY / DISCOLORATION; BROKE ON TOP EDGE OF KNIFE / MILD POROSITY / DISCOLORATION IN BREAK AND ON SURFACE OF BAR; BROKE ON TOP EDGE OF KNIFE / MILD POROSITY / DISCOLORATION IN BREAK AND ON SURFACE OF BAR; BROKE ON TOP EDGE OF KNIFE / MILD POROSITY / DISCOLORATION IN BREAK AND ON SURFACE OF BAR; BROKE ON TOP EDGE OF KNIFE / MILD POROSITY / BOWING ON DOWNSKIN / DISCOLORATION |
| 7 | BROKE ON TOP EDGE OF KNIFE / MILD POROSITY / DISCOLORATION; BROKE ON BOTTOM EDGE OF KNIFE / MILD POROSITY; BROKE ON BOTTOM EDGE OF KNIFE / MILD POROSITY / DISCOLORATION IN BREAK AND ON SURFACE OF BAR; BROKE ON BOTTOM EDGE OF KNIFE / MILD POROSITY / DISCOLORATION IN BREAK AND ON SURFACE OF BAR; BROKE ON TOP EDGE OF KNIFE / MILD POROSITY / DISCOLORATION IN BREAK AND ON SURFACE OF BAR |
| 6.5 | BROKE ON BOTTOM EDGE OF KNIFE / MILD POROSITY; BROKE ON BOTTOM EDGE OF KNIFE / MILD POROSITY / DISCOLORATION ON SURFACE OF BAR; BROKE ON BOTTOM EDGE OF KNIFE / MILD POROSITY / DISCOLORATION IN BREAK AND ON SURFACE OF BAR; BROKE ON TOP EDGE OF KNIFE / MILD POROSITY / DISCOLORATION; BROKE ON TOP EDGE OF KNIFE / MILD POROSITY / DISCOLORATION IN BREAK AND ON SURFACE OF BAR |
| 6 | BROKE ON TOP EDGE OF KNIFE / MILD POROSITY / DISCOLORATION IN BREAK AND ON SURFACE OF BAR; BROKE ON TOP EDGE OF KNIFE / MILD POROSITY / DISCOLORATION ON SURFACE OF BAR; BROKE ON TOP EDGE OF KNIFE / MILD POROSITY / DISCOLORATION IN BREAK AND ON SURFACE OF BAR; BROKE ON TOP EDGE OF KNIFE / MILD POROSITY / DISCOLORATION ON SURFACE OF BAR; BROKE ON TOP EDGE OF KNIFE / MILD POROSITY |
| 5.5 | BROKE ON TOP EDGE OF KNIFE / MILD POROSITY / DISCOLORATION ON SURFACE OF BAR; BROKE ON TOP EDGE OF KNIFE / MILD POROSITY / DISCOLORATION IN BREAK AND ON SURFACE OF BAR; BROKE ON TOP EDGE OF KNIFE / MILD POROSITY; BROKE ON TOP EDGE OF KNIFE / MILD POROSITY / CHIPPED; ON TOP TAB / BOWING ON DOWNSKIN / DISCOLORATION IN BREAK AND ON SURFACE OF BAR; BROKE ON TOP EDGE OF KNIFE / MILD POROSITY |

FIG. 6c

| Table 4B – Job No. 300595 Cake B ESD ||
|---|---|
| Power | x-axis Inspection |
| 6.5 | BROKE ON TOP EDGE OF KNIFE / VOID (~0.040") / MILD POROSITY / DISCOLORATION; BROKE ON TOP EDGE OF KNIFE / MILD POROSITY / TIGER STRIPING ON EDGES OF BAR / BOWING ON DOWNSKIN; BROKE ON BOTTOM EDGE OF KNIFE / MILD POROSITY / TIGER STRIPING ON EDGES OF BAR / DISCOLORATION BROKE ON BOTTOM EDGE OF KNIFE / VOID (~0.048") / MILD POROSITY BROKE ON TOP EDGE OF KNIFE / MICRO POROSITY / DISCOLORATION |
| 6 | BROKE ON BOTTOM EDGE OF KNIFE / MICRO POROSITY BROKE ON CENTER OF BAR / VOID(~0.033") / MICRO POROSITY / DISCOLORATION; BROKE ON BOTTOM EDGE OF KNIFE / MILD POROSITY / TIGER STRIPING ON EDGES OF BAR / DISCOLORATION BROKE ON BOTTOM EDGE OF KNIFE / MILD POROSITY / DISCOLORATION BROKE ON TOP EDGE OF KNIFE / PRISTINE / BOWING ON DOWNSKIN |
| 5.5 | BROKE ON TOP EDGE OF KNIFE / PRISTINE; BROKE ON TOP EDGE OF KNIFE / PRISTINE; BROKE ON TOP EDGE OF KNIFE / MILD POROSITY / TIGER STRIPING ON EDGES OF BAR / DISCOLORATION; BROKE ON TOP EDGE OF KNIFE / MICRO POROSITY /; BOWING ON DOWNSKINBROKE ON BOTTOM ; EDGE OF KNIFE / MILD POROSITY / TIGER STRIPING ON EDGES OF BAR / BOWING ON DOWNSKIN |
| 5 | BROKE ON BOTTOM EDGE OF KNIFE / MILD POROSITY /; BOWING ON DOWNSKIN; BROKE ON TOP EDGE OF KNIFE / MILD POROSITY / DISCOLORATION; BROKE ON BOTTOM EDGE OF KNIFE / MICRO POROSITY / DISCOLORATION; BROKE ON BOTTOM EDGE OF KNIFE / MILD POROSITY; BROKE ON BOTTOM EDGE OF KNIFE / MILD POROSITY / TIGER STRIPING ON EDGES OF BAR / BOWING ON DOWNSKIN |
| 4.5 | BROKE ON TOP EDGE OF KNIFE / MILD POROSITY; BROKE ON TOP EDGE OF KNIFE / MILD POROSITY / TIGER; STRIPING ON EDGES OF BAR / BOWING ON DOWNSKIN; BROKE ON TOP EDGE OF KNIFE / MILD POROSITY; BROKE ON TOP EDGE OF KNIFE / MILD POROSITY / TIGER STRIPING ON EDGES OF BAR / BOWING ON DOWNSKIN; BROKE ON TOP EDGE OF KNIFE / MILD POROSITY / DISCOLORATION |
| 4 | BROKE ON TOP EDGE OF KNIFE / MILD POROSITY; BROKE ON TOP EDGE OF KNIFE / MICRO POROSITY; BROKE ON TOP TAB AND IN GUAGE / MILD POROSITY; BROKE ON TOP EDGE OF KNIFE / MILD POROSITY / TIGER STRIPING ON EDGES OF BAR; BROKE ON BOTTOM EDGE OF KNIFE / MILD POROSITY / DISCOLORATION |
| 3.5 | BROKE ON TOP EDGE OF KNIFE / MILD POROSITY / BOWING ON DOWNSKIN; BROKE ON TOP EDGE OF KNIFE / MILD POROSITY / TIGER STRIPING ON EDGES OF BAR / BOWING ON DOWNSKIN; INVALIDATED DUE TO SLIPPING IN THE GRIP AND RETESTING / BROKE ON TOP EDGE OF KNIFE / MILD POROSITY / DISCOLORATION / TIGER STRIPING ON EDGES; OF BAR; BROKE ON BOTTOM EDGE OF KNIFE / MILD POROSITY; BROKE ON TOP EDGE OF KNIFE / MILD POROSITY / DISCOLORATION / TIGER STRIPING ON EDGES OF BAR / BOWING ON DOWNSKIN |
| 3 | BROKE ON TOP EDGE OF KNIFE / MILD POROSITY / DISCOLORATION / TIGER STRIPING ON EDGES OF BAR; BROKE ON TOP EDGE OF KNIFE / MILD POROSITY / TIGER STRIPING ON EDGES OF BAR; BROKE ON BOTTOM EDGE OF KNIFE / MILD POROSITY / TIGER STRIPING ON EDGES OF BAR / BOWING ON; DOWNSKIN; BROKE ON TOP EDGE OF KNIFE / MILD POROSITY / BOWING ON DOWNSKIN; BROKE ON BOTTOM EDGE OF KNIFE / MILD POROSITY / TIGER STRIPING ON EDGES OF BAR / BOWING ON DOWNSKIN |

FIG. 6d

METHOD FOR ANALYTICALLY DETERMINING LASER POWER FOR LASER SINTERING

CROSS-REFERENCE TO RELATED APPLICATIONS

This application claims the benefit of U.S. Provisional Application No. 62/446,470, filed Jan. 15, 2017; and U.S. Provisional Application No. 62/446,460, filed Jan. 15, 2017. The contents of these prior applications are incorporated herein by reference in their entirety.

TECHNICAL FIELD

The present disclosure generally relates to additive manufacturing technology and techniques. More specifically, the present disclosure relates to a system and method for determining an optimal setting for a laser in a selective laser sintering ("SLS") machine to additively manufacture (i.e., print) an object from polyaryletherketone ("PAEK") polymer powder, recycled powder, and/or other materials.

BACKGROUND

It is known to use additive manufacturing technology and techniques, together with polymer powders, to manufacture high-performance products having applications in various industries (e.g., aerospace, industrial, medical, etc.).

SLS is an additive manufacturing technique that uses electromagnetic radiation from a laser, for example from a $CO_2$ laser, to selectively fuse particles of plastic, metal (direct metal laser sintering), ceramic, or glass powders into a mass having a desired three dimensional shape. SLS may also be referred to as laser sinter or LS. The mass or object is built layer-by-layer on a base plate with the laser traversing each layer in the x-y plane. The laser selectively fuses the powder material by scanning cross-sectional layers generated from a three-dimensional digital description of the desired object onto the top layer or surface of a bed of powder material. That is, the powder must absorb enough laser energy to reach a fusing state necessary for bonding between powder particles. After a cross-sectional layer is scanned, the base plate is lowered by one layer thickness in a z-axis direction, a new layer of powder material is disposed on the bed, and the bed is rescanned by the laser. This process is repeated until the build (i.e., building of the object) is completed.

Prior to scanning, an SLS machine may preheat the powder material disposed on the bed to a temperature proximate to a melting point of the powder. Preheating may be accomplished by heating the actual bed, which transfers energy to the powder in the form of heat via thermal conduction. Pre-heating is also provided via radiant heaters disposed above the bed surface. Preheating the powder makes it easier for the laser to raise the temperature of powder to a fusing point and may inhibit unwanted distortions in the formed object(s) during cooling.

After the layer-wise (layer-by-layer) process is completed, the formed object(s) is disposed in a volume of unfused powder material, referred to as a cake. The formed object(s) is extracted from the cake. The powder material from the cake that is not fused into the built object(s) can be recovered, sieved, and used in a subsequent SLS build process.

Polyaryletherketones ("PAEK") are of interest in the SLS process because parts that have been sintered from PAEK powder are characterized by a low flammability, a good biocompatibility, and a high resistance against hydrolysis and radiation. The thermal resistance at elevated temperatures as well as the chemical resistance distinguishes PAEK powders from ordinary plastic powders. A PAEK polymer powder may be a powder from the group of polyetheretherketone ("PEEK"), polyetherketone ketone ("PEKK"), polyetherketone ("PEK"), polyetheretherketoneketone ("PEEKK"), or polyetherketoneetherketoneketone ("PEKEKK"). P The SLS process is controlled by several groups of parameters, including laser-related parameters, scan-related parameters, powder-related parameters and temperature related parameters. Laser-related parameters can involve laser power, spot size, pulse duration, and pulse frequency. Laser power, in particular, is an important build parameter in laser sintering. The density/porosity and mechanical behavior of an object manufactured by SLS is a function of the laser power and the accumulated laser energy density. In some embodiments, the power of the laser (e.g., $CO_2$ laser) in the SLS machine can by adjusted prior to each build. For example, the EOSINT P 800 laser sintering system created by EOS Gmbh is provided with a 50 W $CO_2$ laser. The P 800 laser, for example, allows for adjustments to the power of the laser beam. In regard to building parts using PAEK polymers, in particular polyetheretherketone ("PEEK"), it is known to use a laser power between 30 W and 50 W to perform laser sintering. Further, parts built by conventional laser sintering methods (at high laser power) have demonstrated tensile strength and/or ductility that is lower than injection molded parts. The formation or presence of porosity, regular porosity between powder layers resulting in weak planar interfaces, and other microstructurel defects have limited the use of conventional laser sintering in producing structural components.

Additionally, consistent powder characteristics are important for ensuring repeatable manufacture of objects. For example, metal powders used in additive manufacturing are assumed to be nominally spherical, and have a particle size distribution that is designed to facilitate good packing behavior, such that the final product has good mechanical properties. Manufacturers typically receive the base powder material from third-party producers in different batches. Each batch of powder material from a particular producer is assigned an identification number (e.g., batch number, lot number) for tracking and quality control checks. In conventional laser sintering methods, the manufacturers typically assume when different batches of powder from the same lot are used, that the powders are identical. Working under this assumption, they apply the same laser power setting for the SLS machine in sintering a particular powder material across different batches. However, such assumption is not grounded in reality, as there are often batch-to-batch variations in powder size, shape, melting points, glass transitions points, and other characteristics for a given powder material. This is especially true for semi-crystalline polymers such as PEKK that exhibit multiple melting points. Large particles tend to require more laser energy to fuse than small particles, so large variations in size can result in complete fusion of small particles (in one batch) and incomplete fusion of large particles (in another batch).

Thus, there exists a need in the art for an improved selective laser sintering method which utilizes lower laser power that is optimized for a given batch of powder material in order to consistently build the same object with greater tensile strength, as compared to the object being manufactured with high laser power.

SUMMARY

The needs set forth herein as well as further and other needs and advantages are addressed by the present teachings, which illustrate solutions and advantages described below.

It is an objective of the present teachings to remedy the above drawbacks and issues associated with prior art selective laser sintering methods.

It is another objective of the present teachings to provide a method of laser sintering a polymer powder using low laser power to build an object(s) having sufficient tensile strength as defined by the standard test method ASTM D638.

It is a further objective of the present teachings to provide a method of analytically determining a laser power for laser sintering a batch/lot of polymer powder to build an object(s) having sufficient tensile strength.

It is yet another objective of the present teachings to provide a method of analytically determining a low laser power for laser sintering a batch/lot of polymer powder to build an object(s) exhibiting sufficient tensile strength, low porosity, and minimal microstructural defects.

The above objectives and aspects of the present teachings relate to the discovery by the inventors of new methods and systems that overcome the problems associated with the prior art. Specifically, it has been discovered an analysis and examination process for determining a laser power setting to use in an SLS machine for laser sintering a particular batch of a given powder material to build an object(s) have greater tensile strength. The inventors have also discovered that using a reduced laser power in performing laser sintering of polymer powders, including recycled powder, results in a completed part that is substantially stronger, particularly in the Z axis, as compared to parts manufactured with convention laser powers.

These and other objectives of the present teachings are achieved by providing a method of analytically determining laser power for laser sintering comprising: choosing a batch of powder material for building a plurality of test rods or test coupons (e.g., dumbbell structure, dogbone structure); selecting a range of laser power for building the plurality of test rods; determining a plurality of power increments within the selected range to define a plurality of different laser power settings; programming a selective laser sintering machine to build at least one test rod of said plurality of test rods at each laser power setting; constructing the plurality of test rods from the batch of powder material based on said programming; inspecting each test rod for voids in a surface of the test rod; identifying the laser power setting used to construct a respective test rod without formation of voids in the surface as an optimal laser power; and configuring the selective laser sintering machine with the optimal laser power when conducting a laser sintering process using the chosen batch of powder material.

In some embodiments, the step of inspecting each test rod for voids comprises inspecting an x-axis of each test rod for presence of voids. The inspection step may also take into account analyzing through inspection each test rod's mechanical properties and tensile behavior during the ASTM D638 test process. For example, such inspection may comprise inspecting a fracture point of each test rod formed during the ASTM D638 test process. The method according to the present teaching may also comprise inspecting a porosity of each test rod. In other embodiments, the step of inspection may involves monitoring the presence/absence of voids in the surfaces of the test rod, the manner in which the test rod fractures or breaks, where the fracture occurs, the presence of banding or bowing, and/or the porosity of the test rod. The method may further include steps of analyzing other factors affecting the laser sintering process and the lifecycle of the built test rod.

Using the above inspection techniques, the optimal laser power may be defined as at least one watt below a lowest laser power setting associated with the formation of voids.

In some embodiments, the method also includes measuring a tensile strength of each test rod and comparing the tensile strength results to determine strength of each test rod. For example, the ASTM D638 test process may be used for measuring the tensile strength of each test rod. The measurements may include measuring the "Z strength" or break point (psi) along the z-axis for each test rod. It is known that Z strength reflects the strength of the internal bond between the layers of an additive manufactured part and is an important characteristic in additive manufacturing. The measurements may also include measuring the "X strength" or break point (psi) along the x-axis. It is noted that Z strength is a larger factor in determining whether an SLS manufactured part has satisfactory mechanical properties. By including tensile strength testing, the step of identifying the optimal laser power may comprise selecting a laser power setting based on the absence of voids in the respective test rod and on the tensile strength of the respective rod, wherein the optimal laser power provides the highest strength in z-axis with no formation of voids.

The step of measuring the tensile strength of each test rod may also include an analysis of the elastic modulus or Young's modulus (psi) of each test rod, as well as the elongation to break/fracture (%) of each test rod. Other factors that may be monitored and evaluated are elongation at yield, nominal strain at break (grip separation), secant modulus of elasticity, and/or Poisson's Ratio.

In some embodiments, the step of choosing a batch of powder material to test includes choosing a batch of polymer powder material. For example, the powder material may be polyaryletherketone ("PAEK") polymer, and in some case, more specifically polyetherketoneketone ("PEKK") polymer. In other embodiments, the step of choosing a batch of powder material to test includes choosing a batch of recycled polymer powder material. The recycled powder material is left-over, unfused material from one previous build ("Cake A"). In some embodiments, the recycled powder material is unfused material left-over after having gone through two previous builds ("Cake B"). Still in other embodiments, the recycled powder material is unfused material left-over after having gone through three or more previous builds (e.g., "Cake C", Cake D").

The present teachings also provide a method of analytically determining laser power for laser sintering comprising: choosing a batch of powder material for building a plurality of test rods having substantially identical shapes; selecting a range of low laser power for building the plurality of test rods; determining a plurality of power increments within the selected range to define a plurality of different laser power settings; programming a selective laser sintering machine to build at least one test rod of said plurality of test rods at each laser power setting; constructing the plurality of test rods from the batch of powder material based on said programming; inspecting each test rod for voids in a surface of the test rod; measuring a tensile strength in a z-axis of each test rod in accordance with ASTM D638 testing and comparing the tensile strength results to determine strength of each test rod; identifying the laser power setting used to construct a respective test rod having no formation of voids and high strength in the z-axis as an optimal laser power; and configuring the selective laser sintering machine with the optimal laser power when conducting a laser sintering process using the chosen batch of powder material.

Exemplary ranges of low laser power to be selected may comprise 1 W to 20 W, 1 W to 15 W, 5 W to 15 W, 5 W to 20 W, or any other permutation of low laser power. In some embodiments, the laser power increments may be determined and set at 0.5 W. In other embodiments, the laser power increments may be set at 0.2 W. In yet other embodiments, the laser power increments may be set at 0.1 W. It is to be understood that the disclosed increments are merely exemplary and are not limited thereto.

In some embodiments of the present teachings, the method comprises programming the SLS machine to construct multiple test rods at each power increment using the chosen batch of powder material. With multiple test rods built using laser power at, for example 10 W, one test rod can be subjected to Z strength testing, while another test rod is subjected to X-strength testing. Furthermore, multiple test rods built at a given laser power allow for multiple tensile strength tests to be performed. That is, two different test rods built at, for example 10 W, can be tested for Z strength. The multiple tests can be used for purposes of verifying results or averaging results. Since the ASTM D638 testing process specifies at least five specimens for testing, it is preferable that at least five test rods at each laser power increment is constructed.

In some embodiments, the step of programming the SLS machine to construct the test rods involves programming the SLS machine to create test rods at each laser power increment in one single build run. Accordingly, the SLS machine is able to adjust the power of the laser beam at various points during one single build run. In other embodiments, the step of programming the SLS machine to construct the test rods involves more than one build to create test rods at each laser power increment. For example, the SLS machine may be programmed to construct multiple test rods at a laser power of 5.0 W in a first build, multiple test rods at a laser power of 5.5 W in a second build, multiple test rods at a laser power of 6.0 W in a third build, and so on and so forth. Accordingly, the SLS machine adjusts the power of the laser at the completion of a build. Alternatively, the SLS machine may be programmed to construct a first set, second set, third set, etc. of test rods in a first, second, third, etc. build, respectively, wherein each set comprises one (or more) test rod constructed at each laser power increment.

The present teachings also provide a method and system for additive manufacturing of an object comprising the steps obtaining a polymer powder material, configuring an SLS machine to emit a laser beam at a power of between 1 W and 20 W, and laser sintering the polymer powder material with the laser beam. This is in contrast to prior art, where laser sintering of a polymer powder is typically performed with a laser power set in the range of 30 W to 50 W. In some embodiments, the SLS machine is configured to emit a laser beam at a power of 5 W to 15 W. In further embodiments, the SLS machine is configured to emit a laser beam at a power between 5 W and 10 W, and in some case, at 8 W. The step of obtaining a polymer power material may comprise obtaining a polymer powder material that is recycled from a previous build. Preferably, the polymer powder material may be unfused material left-over after one previous build. However, in some examples, the polymer powder material may be unfused material left-over after two or more previous builds. The polymer powder may be PAEK polymer. More preferably, the polymer powder is PEKK.

The method and system for additive manufacturing of an object may also comprise the step of analytically determining bed temperatures of the SLS machine, as disclosed in U.S. application Ser. No. 14/472,817, the contents of which are incorporated herein by reference in its entirety for all purposes.

Other features and aspects of the present invention are further described in the following U.S. provisional applications, each of which is incorporated herein by reference in its entirety for all purposes: U.S. Application Nos. 62/446,470 and 62/446,460.

Other features and aspects of the invention will become apparent from the following detailed description, taken in conjunction with the accompanying drawings, which illustrate by way of example the features in accordance with embodiments of the invention. The summary is not intended to limit the scope of the invention, which is defined solely by the claims attached thereto.

BRIEF DESCRIPTION OF THE DRAWINGS

FIGS. 6a-6d are tables showing for each lot of powder material listed in FIG. 4, the x-axis inspection results of a test rod built with a specified laser power. The data contained in FIGS. 6a-6d are associated with the data contained in FIGS. 5a-5d, respectively.

DETAILED DESCRIPTION

The present teachings are described more fully hereinafter with reference to the accompanying drawings, in which the present embodiments are shown. The following description illustrates the present teachings by way of example, not by way of limitation of the principles of the present teachings.

The present teachings have been described in language more or less specific as to structural features. It is to be understood, however, that the present teachings are not limited to the specific features shown and described, since the methods and systems herein disclosed comprise preferred forms of putting the present teachings into effect.

The inventors have discovered new methods and systems to overcome the problems associated with the prior art. Specifically, the inventors have discovered that using a reduced laser power in performing laser sintering of polymer powders, particularly PAEK polymer powders, more particularly PEKK powders, and more particularly recycled PEKK powders (unfused PEKK powder left-over from one or more previous builds) results in a completed part that is substantially stronger, particularly in the Z axis, as compared to parts manufactured with convention laser powers. It is conventionally known to practice laser sintering of PAEK powder with a laser power set in the range of 30 W to 50 W. The inventors, however have discovered that, unexpectedly, a laser power in the range of the 1 W to 10 W used to laser sinter a PEKK polymer, and more specifically recycled PEKK polymer, produces an object having strong tensile strength and structural integrity.

In addition, the inventors have discovered a method and system to determine a laser power setpoint for a specific lot of powder (including a lot of recycled powder). By employing analytical methods and systems to each lot of powder, and, in some cases, to each run of the SLS machine, it is possible to determine an optimal laser power that results in finished parts having desired build properties, including more uniformity, reduced porosity, increased tensile strength. For example, the present invention has been to shown to result in completed parts have a Z strength (i.e., tensile strength in the z direction) greater than 7 KSI using ASTM D638.

The present teachings is especially useful for polyetherketoneketones, or PEKK. Polyetherketoneketones are well-known in the art and can be prepared using any suitable polymerization technique, including the methods described in the following patents, each of which is incorporated herein by reference in its entirety for all purposes: U.S. Pat. Nos. 3,065,205; 3,441,538; 3,442,857; 3,516,966; 4,704,448; 4,816,556; and 6,177,518. PEKK polymers differ from the general class of PAEK polymers in that they often include, as repeating units, two different isomeric forms of ketone-ketone. These repeating units can be represented by the following Formulas and II:

where A is a p,p'-Ph-O-Ph-group, Ph is a phenylene radical, B is p-phenylene, and D is m-phenylene. The Formula I:Formula II isomer ratio, commonly referred to as the T:I ratio in the polyetherketoneketone is selected so as to vary the total crystallinity of the polymer. The T/I ratio is commonly varied from 50:50 to 90:10, and in some embodiments 60/40 to 80/20. A higher T:I ratio such as, 80:20, provides a higher degree of crystallinity as compared to a lower T:I ratio, such as 60:40.

The crystal structure, polymorphism and morphology of homopolymers of PEKK have been studied and have been reported in for example Cheng, Z. D. et al, "Polymorphism and crystal structure identification in poly(aryl ether ketone ketone)s", Macromol. Chem Phys. 197, 185-213 (1996), the disclosure of which is hereby incorporated by reference in its entirety. This article studied PEKK homopolymers having all para-phenylene linkages [PEKK(T)], one meta-phenylene linkage [PEKK(I)] or alternating T and I isomers [PEKK(T/I)]. PEKK(T) and PEKK(T/I) show crystalline polymorphism depending upon the crystallization conditions and methods.

In PEKK(T), two crystalline forms, forms I and II are observed. Form I can be produced when samples are crystallized from the melt at low supercooling, while Form II is typically found via solvent-induced crystallization or by cold-crystallization from the glassy state at relatively high supercooling. PEKK(I) possesses only one crystal unit cell which belongs to the same category as the Form I structure in PEKK(T). The c-axis dimension of the unit cell has been determined as three phenylenes having a zig-zag conformation, with the meta-phenylene lying on the backbone plane. PEKK(T/I) shows crystalline forms I and II (as in the case of PEKK(T)) and also shows, under certain conditions, a Form III.

Suitable polyetherketoneketones are available from several commercial sources under various brand names. For example, polyetherketoneketones are sold under the brand name OXPEKK™ polymers by Oxford Performance Materials, Enfield, Conn., including OXPEKK™-C, OXPEKK™-CE, OXPEKK™-D and OXPEKK™-SP polymers. Polyetherketoneketone polymers are also manufactured and supplied by Arkema. In addition to using polymers with a specific T:I ratio, mixtures of polyetherketoneketones may be employed.

Other useful polymers in the present teachings include, but are not restricted to PEEKEK, PEEKK, PEKEKK (where the E=ether and the K=ketone). Blends or mixtures of polyetherketoneketones may also be employed within the scope of this invention. Other polymorphic polymers that could benefit from the heat-treatment of the invention include, but are not limited to: polyamide 11 (PA11) and polyvinylidene fluoride (PVDF) homopolymers and copolymers.

The heat treatment described in the present teachings could also be applicable to materials with a single crystal form such as PEEK (polyether ether ketone) and PEK (polyether ketone), where the treatment at elevated temperatures will promote increases in the linear degree of crystallinity of the crystalline lamellae, affecting in a direct manner the melting temperature of the final product.

The powders used in these applications are prepared by a variety of processes such as grinding, air milling, spray drying, freeze-drying, or direct melt processing to fine powders. The heat treatment can be accomplished before or after the powders are produced, but if treated prior to forming the powders, the temperature of the powder forming process must be regulated so as to not significantly reduce the melting temperature or the quantity of the crystallinity formed in the heat treatment process.

The heat treatment process and the powders produced by this process are not limited to any particular particle size. And as discussed above, the particle size can be adjusted prior to or after the heat treatment process based on the needs of the specific application as long as the beneficial properties of high melting point and high degree of crystallinity are not compromised. In general, heat-treated powders will have a weight average particle size of between 0.002 nm to 0.1 meter, and more preferably from 0.01 nm to 1.0 mm. For use in selective laser sintering (SLS) a weight average particle size of 15 to 150 microns is preferred.

According to one aspect of the present teachings, a method for preparing a PEKK powder for use in SLS includes the steps of: providing a raw, non-powder PEKK material; heat treating the raw PEKK to evaporate at least substantially all of a liquid solvent in the raw PEKK, causing at least substantially all of the raw PEKK to be in the form of irregularly-shaped particles; cooling the raw PEKK; and grinding the raw PEKK to form a fine PEKK powder.

Method of Laser Printing

Figure 1:
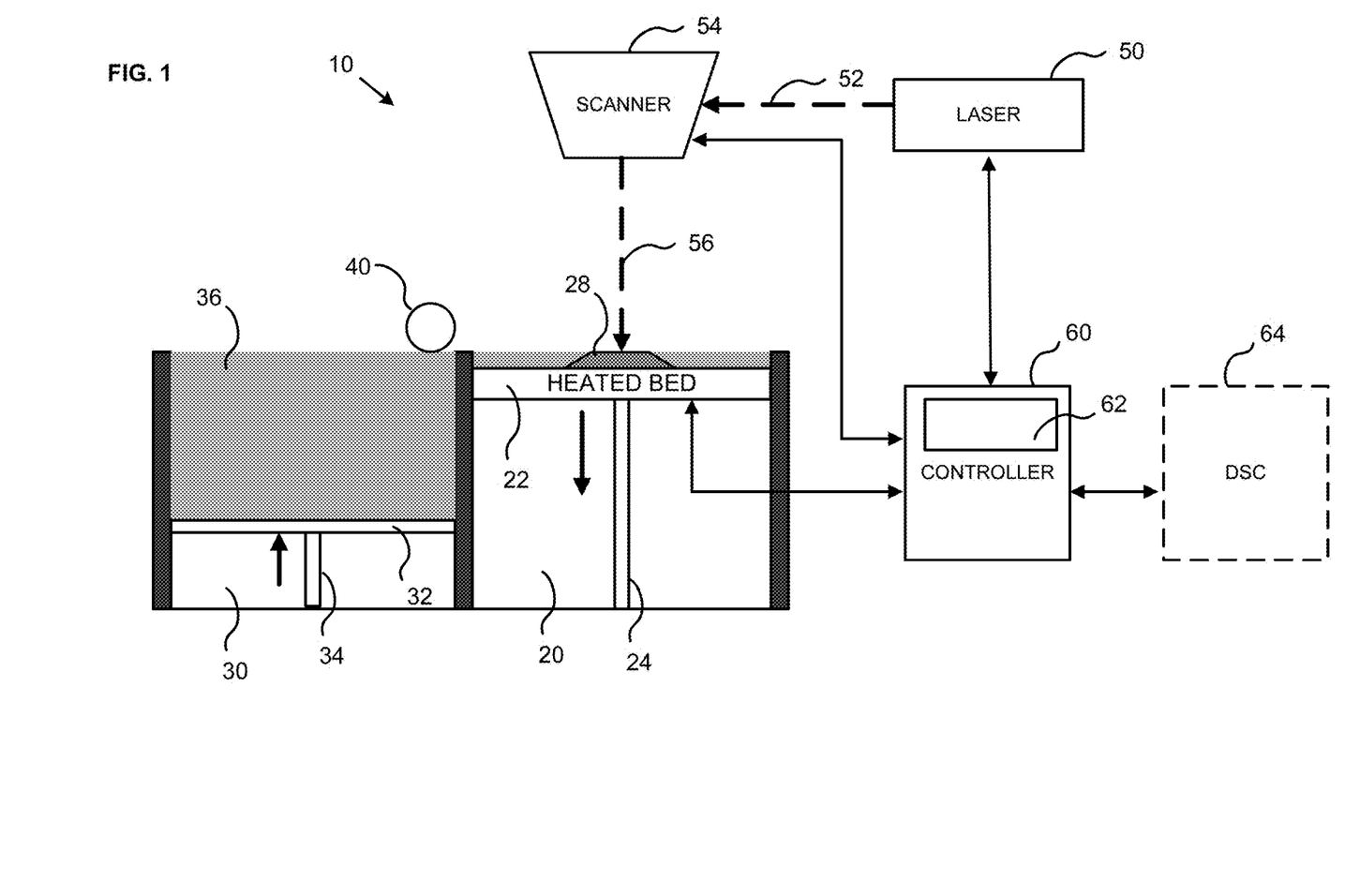
FIG. 1 illustrates an SLS machine in accordance with one embodiment of the present teachings.

In reference to FIG. 1, an SLS machine 10 in accordance with the present teachings is illustrated. The system 10 includes a first chamber 20 having an actuatable piston 24 disposed therein. A bed or base plate 22 is disposed at an end of the piston 24. The temperature of the bed 22 can be variably controlled via a controller 60 in communication with heating elements in and or around the bed 22. The bed temperature setpoint is input through an interface 62 into the controller 60. Software executing on the controller 60 transmits a signal to one or more heating elements to heat the bed at or around the temperature setpoint. A second chamber 30 is adjacent to the first chamber 20. The second chamber 30 includes a table surface 32 disposed on an end of a piston 34 disposed therein. A powder 36 for use during in the SLS machine 10 is stored in the second chamber 30 prior to the sintering step.

While a particular embodiment of an SLS machine is disclosed, the present teachings are not limited in this regarding and the present teachings may be practiced with different high temperature SLS machines, such as the EOSINT 800 manufactured and sold by EOS GmbH, based in Krailling, Germany.

Referring to FIG. 1, during operation of the SLS machine 10, a spreader 40 or similar device traverses or translates across a top surface of the first chamber 20, evenly distributing a layer of powder 36 (e.g., PEKK powder, fine PEKK powder, recycled PEKK powder) across either the top surface of the bed 22, or the material previously disposed on the bed. The SLS machine 10 preheats the powder material 26 disposed on the bed 22 to a temperature proximate to a melting point of the powder. Preheating is typically accomplished by heating the actual bed, as described above, which transfers energy to the powder in the form of heat via thermal conduction. Preheating the powder makes it easier for the laser to raise the temperature of powder to a fusing point. In some embodiments of the present teachings, there are also one or more heating elements in and/or around the second chamber 30 in order to heat the powder 36 prior to being delivered to the sintering surface (bed 28).

A laser 50 and a scanning device 54 are disposed above the bed. In the P 800, the laser is a 50 W $CO_2$ laser. It is noted that the 50 W $CO_2$ laser is exemplary, and the present teachings are not limited thereto. The laser transmits a beam 52 to the scanner 54, which then distributes a laser beam 56 across the layer of powder 36 disposed on the bed 22 in accordance with a build program. The laser selectively fuses powdered material by scanning cross-sections generated from a three dimensional digital description of the part on the surface of the bed 56 having a layer of the powdered material disposed thereon. The laser 50 and the scanner 54 are in communication with the controller 60. After a cross-section is scanned, the bed 22 is lowered by one layer thickness, a new layer of powdered material is disposed on the bed via the spreader 40, and the bed is rescanned by the laser. This process is repeated until the build 28 is completed. During this process, the cylinder 34 in the second chamber is incrementally raised to ensure that there is sufficient supply of powder. The SLS machine in FIG. 1 may also be configured with a mechanism for analytically determining bed temperatures of the SLS machine, as disclosed in U.S. application Ser. No. 14/472,817, the contents of which are incorporated herein by reference in its entirety for all purposes.

Using the above described PEKK, the bed temperature is set to approximately 285 degrees Celsius and the laser power is set at a power in the range of 1 W to 20 W. In some embodiments, the laser power is set within a range of 5 W to 10 W. In some embodiments, the laser power is set within a range of 6 W to 9 W. For example, the power may be set at 5 W or 8 W. A powder layer thickness of 125 microns is typical. After the layer-wise build is performed, the powder cake is allowed to cool at controlled rates. For example, for PEKK, the cake is typically cooled at between 1 and 100 degrees Celsius per hour. It should be appreciated by a person of ordinary skill in the art that the rate of cooling depends on the dimensions of the cake, with deeper beds typically requiring more time to cool.

Parts manufactured by using the disclosed process demonstrated a greater tensile strength as determined by the ASTM D638 as compared to parts manufactured using a laser power selected in the range of 30 W to 50 W, as is known in the art and as is recommended by the manufacturer of the EOSINT P 800 SLS machine.

In order to determine the optimal laser power to use in configuring the SLS machine for selectively laser sintering a particular batch of polymer powder, a method of analytically determining laser power for laser printing may be used and is described in detail below.

Method of Analytically Determining Laser Power for Laser Printing

In one embodiment of the present teachings, a method of determining a preferred and/or optimal laser power for a specific batch or lot of powder is provided.

Figure 2:
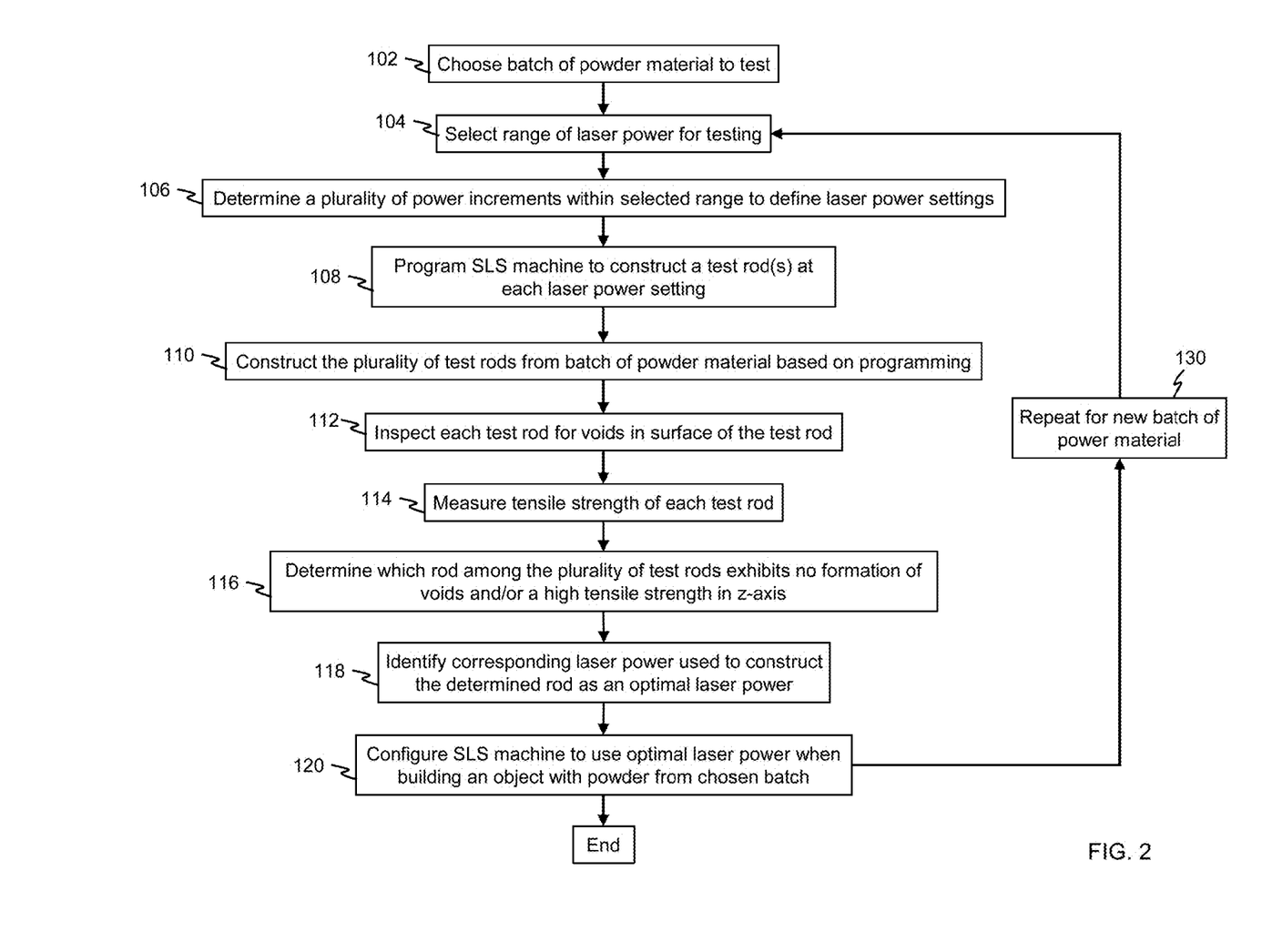
FIG. 2 illustrates a method of analytically determining an optimal laser power for laser sintering a particular batch of polymer powder.

Referring to FIG. 2, the method first includes the step 102 of choosing a batch of powder material for building a plurality of test rods or test coupons. A manufacturer specializing in additive manufacturing (e.g., SLS) usually receives the base material from third-party producers in different batches. Each batch of base material is designated with a batch number and/or lot number, which identifies the origin and characteristics of the base material. The batch number and/or lot number allows the history of the batch's production to be traced and provides for quality control checks. Also, all relevant issues of control and production particulars may also be traceable from the batch and/or lot numbers.

In some embodiments, the batch of powder comprises polymer powder material. For example, the polymer powder comprises PAEK powder, and in particular PEKK powder. The batch of powder may comprise PEKK powder or alternatively, PEKK polymer with carbon (ESD) that has been treated prior to laser sintering. Still, in some embodiments, the batch of powder is made up of recycled polymer powder that were not subjected to fusion and were left-over from one or more previous build runs. For example, the recycled powder material may be left-over, unfused material from one previous build ("Cake A"). Unfused powder material left-over after having gone through two previous builds ("Cake B") may be recycled and used. Still in other cases, the recycled powder material is unfused material left-over after having gone through three or more previous builds (e.g., "Cake C", Cake D").

Once a batch has been chosen, a range of laser powers for sintering the powder material is selected in step 104. For example, the range of laser powers to test may be between 1 W and 20 W. In some embodiments, the range of laser powers to test may be narrower than 1 W to 20 W. That is, 5 W to 15 W, 5 W to 10 W, or 6 W to 9 W may be possible laser power ranges. It is to be understood that the disclosed ranges are exemplary and are not limited thereto.

Thereafter, in step 106, a plurality of power increments within the selected range is determined to define laser power settings for constructing test rods (e.g., dumbbell structure, dogbone structure). For example, increments of 0.5 W may be determined for a range of 5 W to 15 W, such that one or more test rods are constructed from laser sintering the polymer powder at each of 5.0 W, 5.5 W, 6.0 W, 6.5 W, 7.0 W, . . . 14.0 W, 14.5 W, and 15.0 W. Depending on how wide or narrow the selected range of laser power is, larger increments (e.g., 1.0 W increment) may be used so that the number of test rods to be constructed and tested may be reduced. Conversely, smaller increments (e.g., 0.2 W increment, 0.1 W increment) may be determined in order to achieve greater precision and accuracy for determining which particular laser power setting is preferable and/or optimal for sintering the chosen batch of powder material. In one embodiment, at least 8 different laser power settings are chosen for qualification testing. In a preferred embodiment, with respect to steps 104-106, a table with every past lot of powder that includes the range of exposures used, the temperature settings (of the chamber), the chosen exposure, and information from DSC (differential scanning calorimetry) can be used to determine the at least 8 different laser power settings for the qualification build.

Figure 3:
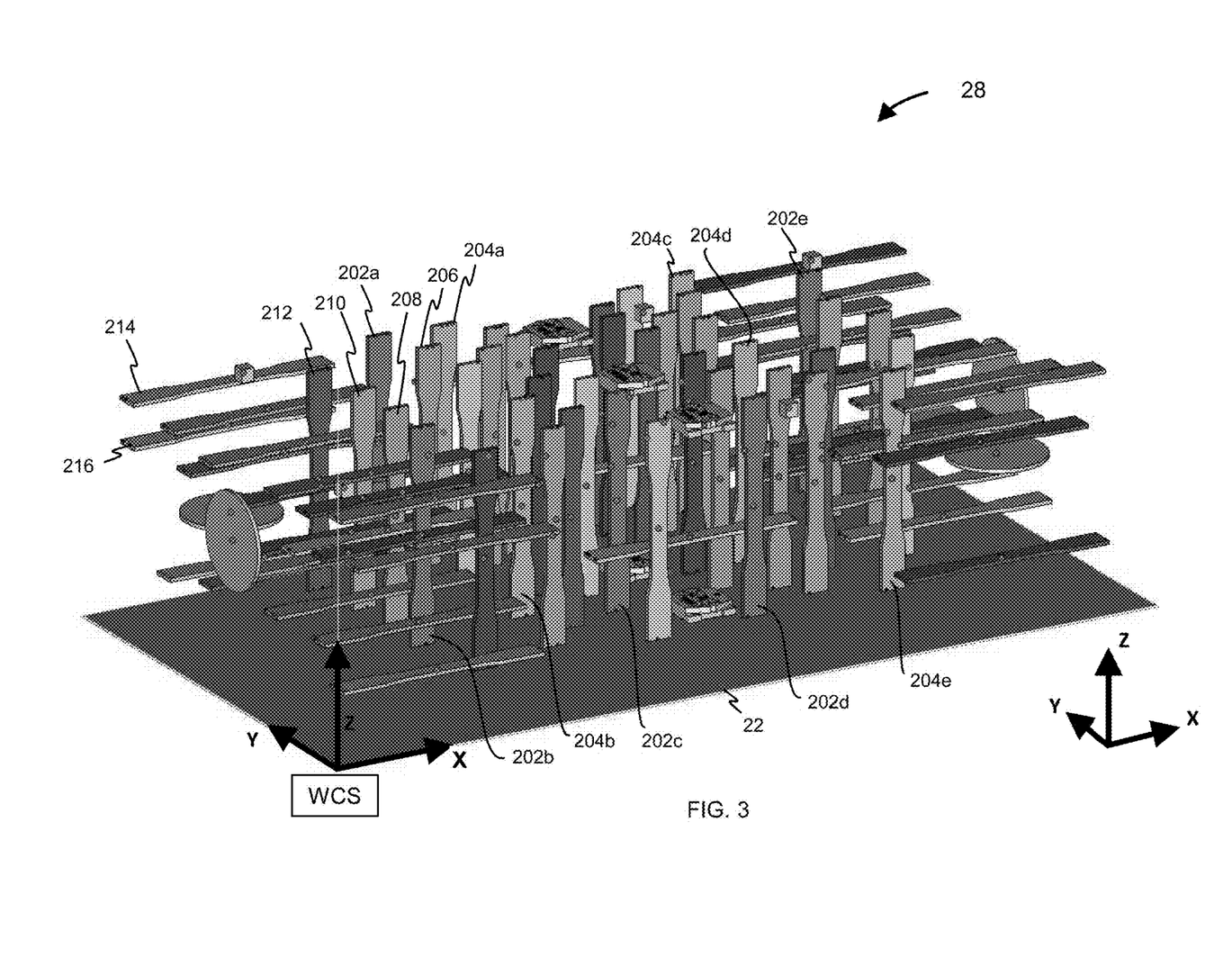
FIG. 3 illustrates a qualification build layout for manufacturing a plurality of parts using SLS.

The method shown in FIG. 2 includes the step 108 of programming the additive manufacturing machine (e.g., SLS machine) to construct a number of identically shaped test rods at each laser power setting using the chosen batch of powder material. The step 108 may comprise programming the SLS machine to construct one or multiple test rods at each power setting using the chosen batch of powder material. As such, the laser 50 is adjusted in real-time to sinter at a first power setting (e.g., 5.0 W) and subsequently sinter at a second power setting (e.g., 5.5 W), so on and so forth. FIG. 3 illustrates this particular configuration, where multiple test rods 202-216 are constructed using different laser wattages (depicted by different colors in the figure). For example, test rods 202a-202e are built using laser wattage at 5.0 W, while test rods 204a-204e are built using laser wattage at 6.0 W. Further, the SLS machine may be programmed to construct a plurality of test rods so that their longitudinal axes are aligned in the z-direction (test rods 202-212) and another plurality of test rods so that their longitudinal axes lie in or are parallel to the x-y plane. The two different orientations for building the test rods allows for multiple tensile strength tests, as will be described in detail below.

With multiple test rods being built at each laser power setting, one test rod can be subjected to Z strength testing, while another test rod is subjected to X-strength testing, according to ASTM D638. Multiple test rods built at a given laser power also provide for multiple tensile strength tests to be performed for that particular laser power. That is, two different test rods built at, for example 10 W, can be tested for Z strength. The multiple tests can be used for purposes of verifying results or averaging results. Since the ASTM D638 testing process specifies at least five specimens for testing, it is preferable that at least five test rods at each laser power increment is constructed.

In some embodiments, the step of programming the SLS machine to construct the test rods involves programming the SLS machine to create test rods at each laser power setting in one single build run (FIG. 3). Accordingly, the SLS machine is able to adjust the power of the laser beam at various points during one single build run. In other embodiments, the step of programming the SLS machine to construct the test rods involves multiple build runs to create test rods at each laser power setting. For example, the SLS machine may be programmed to construct multiple test rods at a laser power of 5.0 W in a first build, multiple test rods at a laser power of 5.5 W in a second build, multiple test rods at a laser power of 6.0 W in a third build, so on and so forth. Accordingly, the SLS machine adjusts the power of the laser at the completion of a build. Alternatively, the SLS machine may be programmed to construct a first set, second set, third set, etc. of test rods in a first, second, third, etc. build, respectively, wherein each set comprises at least one test rod constructed at each laser power setting.

The method according to the present teachings then includes the step 110 of using the SLS machine to construct the plurality of identically shaped test rods from the chosen batch of powder material based on the programming performed in step 108. Each of the test rods is sintered by a specified laser power setting. For example, in one embodiment, ten different laser powers are used to manufacture ten test rods. In this embodiment, for example, a laser power setting of 5.0 W is used for the first rod. The laser power increases in half Watt increments for each subsequent test rod. For example, a laser power setting of 5.5 W is used for the second rod, a laser power setting of 6 W is used for the third rod. In some high temperature machines, such as the EOSINT P 800, the machine is configured to provide variable laser power in a single build layer, wherein different laser powers can be used in discrete sections of the build layer. In this manner, it is possible to prepare a plurality of test rods using different laser powers from a single lot of powder in a single build.

After the build is complete, in step 112, each test rod is removed from the powder cake and then inspected (e.g., visually, using tomography, or other computer-based imaging) for voids or other defects in the surface(s) of the test rod. Voids and/or other defects in the test rod indicate a potential issue with the specific laser power used to construct the respective test rod. The step 112 may further comprise inspecting a fracture point of each test rod formed during an ASTM D638 test process. In addition, the porosity of each test rod may be inspected (e.g., visually, using tomography, or other computer-based imaging). For example, optical coherence tomography (OCT) or other computer-based imaging may be used to determine porosity of each test rod. The system shown in FIG. 1 may comprise an OCT sensor or scanner that provides in-situ, real-time subsurface visualization of the test rods as they are built. In some embodiments of the present invention, precision instruments are used to measure any voids identified during inspection.

In some embodiments, step 112 may also take into account the inspection of each test rod's mechanical properties and tensile behavior during an ASTM D638 testing process. For example, such inspection analysis may comprise monitoring the manner in which the test rod fractures or breaks, where the fracture occurs, and the presence of banding or bowing. The method may further include the step of analyzing other factors affecting the laser sintering and the lifecycle of the built test rod.

In addition to inspecting each test rod for voids, the method according to the present teachings may include the additional step 114 of measuring the tensile strength of each test rod and comparing the tensile strength results to determine strength of each test rod. In particular, each test rod is subjected to the ASTM D638 test procedure. ASTM D638 is a common plastic strength specifications and covers the tensile properties of unreinforced and reinforced plastics. This test method uses standard "dumbbell" or "dogbone" shaped specimens. A universal testing machine (tensile testing machine) performs the test. The testing machine obtains information about the tested part, including the tensile strength. The higher the yield strength, the more preferable the test rod.

In step 116 of the method according to the present teachings, it is determined, based on the inspection (step 112) and/or tensile strength measurements (step 114) which rod among the plurality of test rods exhibits desired mechanical properties. For example, a rod exhibiting the absence of voids in its surface has better mechanical properties than a rod having voids. In addition to the results of inspection or alternatively, high tensile strength balanced with other factors (e.g., porosity) may be used for determining which rod among the plurality of test rods possess acceptable/desirable mechanical properties. In some embodiments, this step includes analyzing the measurements of Z strength or the break point (psi) along the z-axis for each test rod. It is known that Z strength reflects the strength of the internal bond between the layers of an additive manufactured part and is an important characteristic in additive manufacturing. Based on evaluation of the tensile strength test results, one or more rods at a particular laser power may be identified as exhibiting higher "Z strength".

In other embodiments, the evaluation of tensile strength may also include an analysis of the elastic modulus or Young's modulus (psi) of each test rod, as well as the elongation to break/fracture (%) of each test rod. Other factors that may be monitored and evaluated are elongation at yield, nominal strain at break (grip separation), secant modulus of elasticity, and/or Poisson's Ratio.

In some embodiments, the step 116 may include evaluating each test rod with respect to its "x strength" or break point (psi) along the x-axis. For example, a test rod which exhibits improved tensile strength may exhibit a high Z strength and a high X strength.

In accordance with the present teachings, a plurality or rods manufactured at different laser powers from a single lot of powder or during a single build are inspected for void formation and/or tested using the ASTM D638. The test rod with the most desirable qualities is for example the rod having no formation of voids in the x-axis and a high Z strength.

Step 118 of the method according to the present teachings comprises identifying the laser power setting used to construct a respective test rod without formation of voids in the surface as an optimal laser power. In some embodiments, the optimal laser power is at least one watt below a lowest laser power setting associated with the formation of voids. That is, an exposure that is at least one watt below any voids in the x-bar or x-axis results. In other embodiments, the optimal laser power is at least one watt below a lowest laser power setting associated with the formation of voids and exhibits z-axis tensile strength that has not decreased substantially. In general, the highest wattage while avoiding possible voids is considered the optimal and/or preferable. In yet other embodiments, the step of identifying the optimal laser power comprises selecting a laser power setting based on the absence of voids in the respective test rod and on the tensile strength of the respective rod, wherein the optimal laser power provides the highest strength in z-axis with no formation of voids.

Thereafter, the laser power associated with the selected rod is then used for subsequent builds made from the same batch/lot of powder (step 120). That is, the SLS machine may be configured to use the optimal/preferable laser power when building an object(s) with powder from the chosen batch. In some embodiments, the optimal/preferable laser power and corresponding batch/lot number may be saved in a database or memory storage unit within the controller 62 so that the SLS machine can be configured at a later time when future construction of an object using the chosen batch of powder material is required.

In some embodiments of the present teachings, a DSC analysis of the specific lot of powder is performed and stored in association with the optimal laser power. In this manner, it is possible to prepare a library of optimal laser powers for different lots of powders based on the DSC. Such library may be saved in a database or memory storage unit within the controller 62. Thus, when a new lot of powder is prepared, a DSC analysis is conducted. If the DSC profile is similar to a profile stored in the library, the operator can determine the laser associated with the similar DSC profile in the library and use it with the new lot of powder.

Finally, the method shown in FIG. 2 may comprise a step 130, wherein steps 104-120 are repeated for another batch of powdered material.

Figure 4:
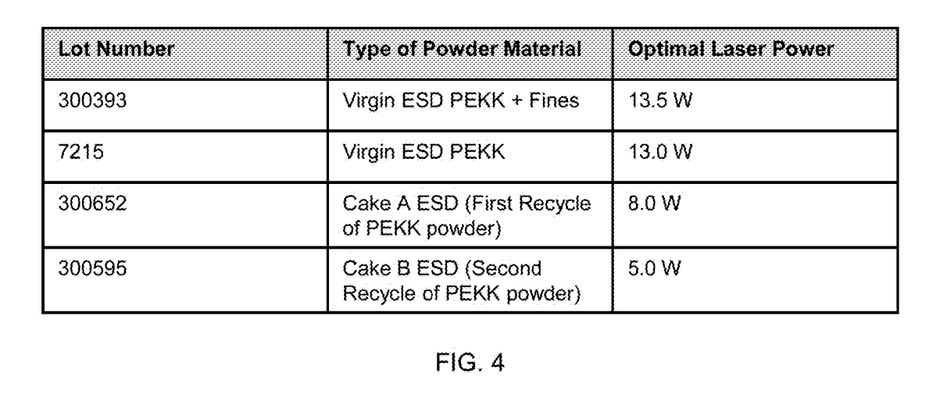
FIG. 4 is a table showing exemplary lots of powder material and the optimal laser power determined for the respective lot.

FIG. 4 shows a table of exemplary lots of powder material and the optimal and/or preferable laser power that was determined to produce objects with no voids and strong mechanical properties for the respective lot. For Lot #300393, which consisted of Virgin ESD PEKK+ Fines, an optimal laser power of 13.5 W was determined using the method according to the present teachings. In contrast, a laser power of 13.0 W was determined to be optimal or preferable for Lot #7215 consisting of Virgin ESD PEKK. It was also unexpectedly discovered that recycled polymer powder demonstrated even lower laser powers to achieve no voids and strong tensile properties in objects constructed therefrom. For example, Lot #300652 represents Cake A ESD (First Recycle of PEKK powder) and has an optimal laser power of 8.0 W. Moreover, a laser power of 5.0 W was determined as being optimal for Lot #300595, consisting of Cake B ESD (Second Recycle of PEKK powder).

Figure 5A:
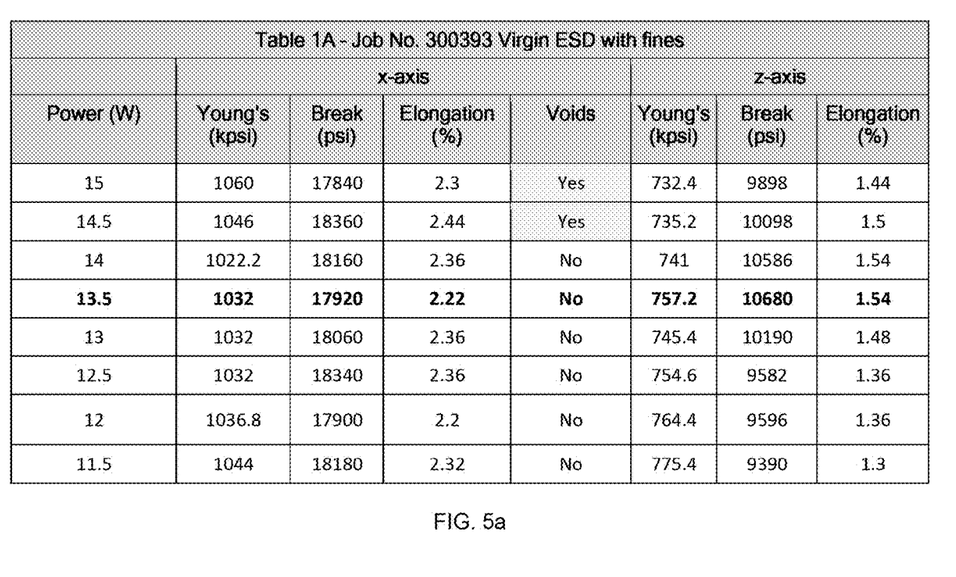
FIGS. 5a-5d are tables showing for each lot of powder material listed in FIG. 4, the mechanical properties of a test rod built with a specified laser power.

FIGS. 5a-5d shows detailed results of the inspection (for presence/absence of voids) and tensile strength tests (ASTM D638) performed on the tests rods produced using powdered material from the lots identified in FIG. 4. In FIG. 5a, relating to Lot No. 300393 Virgin ESD with fines, the lowest laser power setting associated with the formation of voids in the test rod was 14.5 W. Thus, the laser power setting of 13.5 W, which is one watt below 14.5 W and which exhibited no formation of voids, was identified as being the optimal laser power. The test rod produced using the 13.5 W laser beam exhibited a break point of approximately 10680 psi in the z-axis.

Figure 5B:
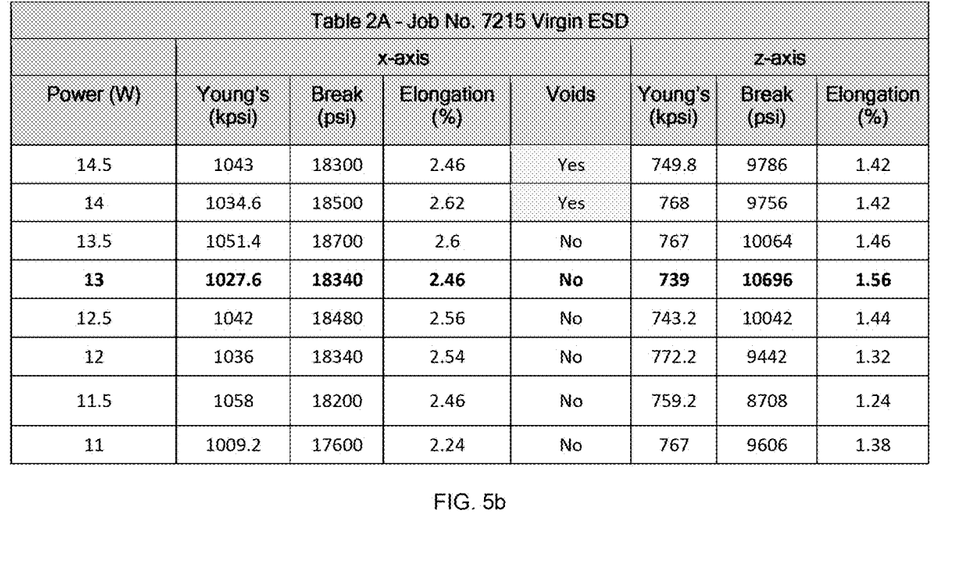

In FIG. 5b, relating to Lot No. 7215 Virgin ESD PEKK, the lowest laser power setting associated with the formation of voids in the test rod was 14.0 W. Thus, the laser power setting of 13.0 W, which is one watt below 14.0 W and which exhibited no formation of voids, was identified as being the optimal laser power. The test rod produced using the 13.0 W laser beam exhibited a break point of approximately 10696 psi in the z-axis.

Figure 5C:
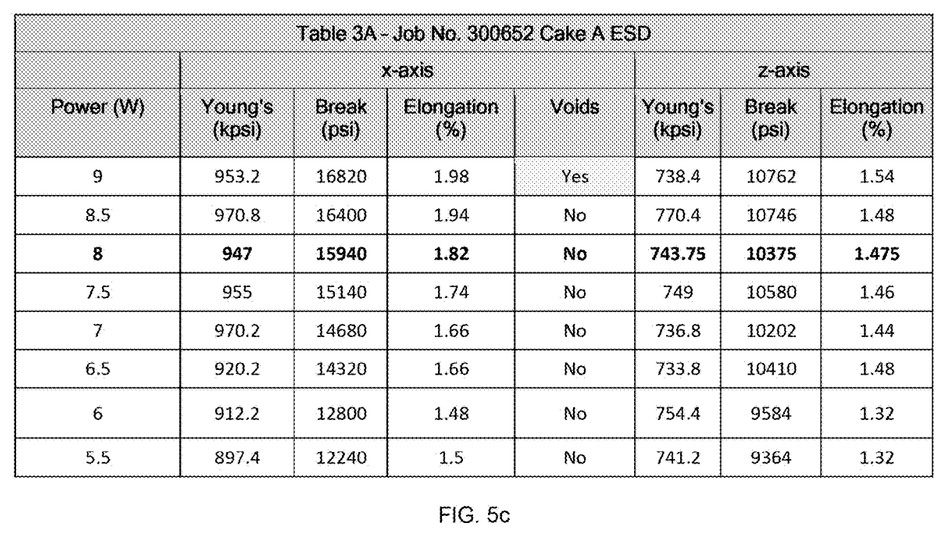

In FIG. 5c, relating to Lot No. 300652 represents Cake A ESD, the lowest laser power setting associated with the formation of voids in the test rod was 9.0 W. Thus, the laser power setting of 8.0 W, which is one watt below 9.0 W and which exhibited no formation of voids, was identified as being the optimal laser power. The test rod produced using the 8.0 W laser beam exhibited a break point of approximately 10375 psi in the z-axis.

Figure 5D:
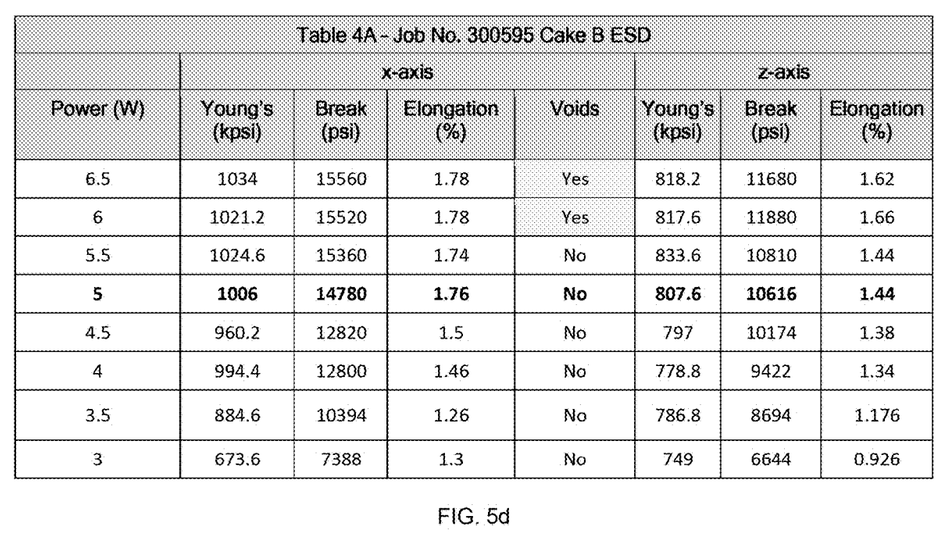

In FIG. 5d, relating to Lot No. 300595 represents Cake B ESD, the lowest laser power setting associated with the formation of voids in the test rod was 6.0 W. Thus, the laser power setting of 5.0 W, which is one watt below 6.0 W and which exhibited no formation of voids, was identified as being the optimal laser power. The test rod produced using the 5.0 W laser beam exhibited a break point of approximately 10616 psi in the z-axis.

These results help demonstrate that recycled polymer powder material provides for lower laser power in laser sintering processes, without substantially reducing overall tensile strength and causing formation of voids in the built object/part.

FIGS. 6a-6d shows inspection results (regarding formation of voids) of test rods in further detail. The data contained in FIGS. 6a-6d are associated with the data contained in FIGS. 5a-5d, respectively. These inspection results were utilized in determining and identifying the optimal laser power setting.

While the present teachings have been described above in terms of specific embodiments, it is to be understood that they are not limited to those disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A method of analytically determining a laser power for configuring a laser in a selective laser sintering process, comprising:
choosing a batch of polymer powder material for building a plurality of test rods;
selecting a range of laser power for building the plurality of test rods;
determining a plurality of power increments within the selected range to define a plurality of different laser power settings;
programming a selective laser sintering machine to build at least one test rod of said plurality of test rods at each laser power setting;
constructing the plurality of test rods from the batch of powder material based on said programming;
inspecting each test rod for voids in a surface of the test rod, the voids having a width of a least 0.005";
identifying the laser power setting used to construct a respective test rod without formation of voids in the surface as an optimal laser power; and
configuring the selective laser sintering machine with the optimal laser power when conducting a laser sintering process using the chosen batch of powder material.

2. The method of claim 1, further comprising:
measuring a tensile strength of each test rod to obtain tensile strength results;
and comparing the tensile strength results.

3. The method of claim 2, wherein the step of measuring the tensile strength of each test rod comprises testing each test rod according to ASTM D638 test process.

4. The method of claim 2, wherein the step of measuring the tensile strength of each test rod comprises measuring the tensile strength of each test rod in a z-axis and comparing the tensile strength results to determine which test rod of said plurality of test rods provides a higher break point in the z-axis.

5. The method of claim 1, further comprising inspecting a fracture point of each test rod, the fracture point formed during an ASTM D638 test process.

6. The method of claim 5, wherein the step of inspecting each test rod further comprises inspecting a porosity of each test rod.

7. The method of claim 1, wherein the optimal laser power is at least one watt below a lowest laser power setting associated with the formation of voids.

8. The method of claim 1, wherein the step of inspecting each test rod for voids comprises inspecting an x-axis of each test rod for presence of voids.

9. The method of claim 2, wherein the step of identifying the optimal laser power comprises selecting a laser power setting based on the absence of voids in the respective test rod and on the tensile strength of the respective rod, wherein the optimal laser power provides the highest strength in z-axis with no formation of voids.

10. The method of claim 2, wherein the step of measuring the tensile strength of each test rod comprises measuring at least one of the following for each test rod: Young's modulus, elongation to break, elongation at yield, nominal strain at break, secant modulus of elasticity, or Poisson's Ratio.

11. The method of claim 1, wherein the chosen batch of powder material comprises PEKK polymer.

12. The method of claim 11, wherein the chosen batch of powder material comprises recycled PEKK polymer.

13. The method of claim 1, wherein the step of selecting a range of laser power comprises selecting a range between 1 W and 20 W.

14. The method of claim 13, wherein the step of selecting a range of laser power comprises selecting a range between 5 W and 15 W.

15. A method of analytically determining a low laser power for configuring a laser in a laser sintering process, comprising:
choosing a batch of polymer powder material for building a plurality of test rods having substantially identical shapes;
selecting a range of laser power between 5 W and 15 W for building the plurality of test rods;
determining a plurality of power increments within the selected range to define a plurality of different laser power settings;
programming a selective laser sintering machine to build at least one test rod of said plurality of test rods at each laser power setting;
constructing the plurality of test rods from the batch of powder material based on said programming, wherein the test rods are oriented along a z-axis in a build chamber of the selective laser sintering machine;
inspecting each test rod for voids in a surface of the test rod, the voids having a width of a least 0.005";
measuring a tensile strength of each test rod to obtain tensile strength results;
comparing the tensile strength results to determine the test rod with the highest tensile strength;
identifying the laser power setting used to construct a respective test rod having no formation of voids and high strength in the z-axis as an optimal laser power; and
configuring the selective laser sintering machine with the optimal laser power when conducting a laser sintering process using the chosen batch of powder material.

16. The method of claim 15, wherein the optimal laser power is at least one watt below a lowest laser power setting associated with the formation of voids.

17. The method of claim 15, wherein the step of programming comprises programming the selective laser sintering machine to build at least five test rods of said plurality of test rods at each laser power setting.

18. The method of claim 15, wherein said plurality of different laser power settings comprises at least eight different last power settings.

19. The method of claim 15, wherein the step of programming comprises programming the selective laser sintering machine to build said plurality of test rods in one single build run.

* * * * *